United States Patent [19]

Hutson

[11] Patent Number: 5,077,662
[45] Date of Patent: Dec. 31, 1991

[54] MICROPROCESSOR CONTROL SYSTEM HAVING EXPANDED INTERRUPT CAPABILITIES

[75] Inventor: John Hutson, Palo Alto, Calif.

[73] Assignee: Ampex Corporation, Redwood City, Calif.

[21] Appl. No.: 456,033

[22] Filed: Dec. 22, 1989

Related U.S. Application Data

[63] Continuation of Ser. No. 851,061, Apr. 11, 1986, abandoned.

[51] Int. Cl.⁵ ............................................. G06F 13/34
[52] U.S. Cl. ............................ 395/725; 364/242.9; 364/241.5; 364/DIG. 2
[58] Field of Search ............... 364/200 MS, 900 MS, 364/725

[56] References Cited

U.S. PATENT DOCUMENTS

| | | | |
|---|---|---|---|
| 3,286,236 | 11/1966 | Logan et al. | 364/200 |
| 3,825,902 | 7/1974 | Brown et al. | 364/200 |
| 3,925,766 | 12/1975 | Bardotti et al. | 364/200 |
| 3,995,258 | 11/1976 | Barlow | 364/200 |
| 4,034,349 | 7/1977 | Monaco et al. | 364/200 |
| 4,381,542 | 4/1983 | Binder et al. | 364/200 |
| 4,390,944 | 6/1983 | Quackenbush et al. | 364/200 |
| 4,390,945 | 6/1983 | Olsen et al. | 364/200 |
| 4,408,300 | 10/1983 | Shima | 364/900 |

OTHER PUBLICATIONS

Hewlett Packard Application Note AN-1013, "Elements of a Bar Code System", Nov. 1983.
Hewlett Packard Application Note AN-1014, "Microprocessor Based Bar Code Decoder Design", Nov. 1982.

*Primary Examiner*—David Y. Eng
*Attorney, Agent, or Firm*—James A. LaBarre

[57] ABSTRACT

To expand the interrupt capabilities of a microprocessor system without restructing system architecture, intermediate levels of priority are created for a given interrupt request. Plural interrupts can be handled on one interrupt request line to thereby permit execution of a number of functions that is greater than the number of interrupt lines. A system controller which provides this capabitlity can monitor the various functions during their execution, as well as arbitrate among plural interrupts so as to maintain the priority which has been assigned to them.

6 Claims, 2 Drawing Sheets

MICROPROCESSOR CONTROL SYSTEM HAVING EXPANDED INTERRUPT CAPABILITIES

This is a continuation of copending application(s) Ser. No. 851,061 filed on Apr. 11, 1986, now abandoned and which designated the U.S.

BACKGROUND OF THE INVENTION

The present invention is directed to microprocessor control systems, and in particular to systems which employ interrupt requests to control the manner in which a microprocessor executes various system functions.

In microprocessor controlled systems which require a variety of system functions to be controlled in a nonsequential fashion, it is a common practice to employ interrupts to determine the order in which various operations are to be performed by the microprocessor. Each interrupt is generated in response to the occurrence of a predetermined event in the operation of the system. When the microprocessor receives an interrupt request, it halts its ongoing operation at an appropriate point, and proceeds to a predetermined subroutine that controls the function associated with the interrupt that was generated.

Any particular microprocessor architecture arrangement will have a predetermined number of interrupt request lines that are available for use in servicing system functions. For example, a typical VME bus structure might provide six available interrupt request lines. A difficulty arises if the number of system functions to be executed, or the number of interrupt generating events, is greater than the number of available request lines. This type of situation places a burden on the system designer. In particular, it may be necessary to restructure the total system architecture, which could prove to be a costly undertaking. If this is not possible or desirable, then compromises will have to be made in the overall performance of the system, and could result in overburdening the system processor.

Accordingly, it is an object of the present invention to expand the interrupt capabilities of a microprocessor system without restructuring the system architecture.

BRIEF STATEMENT OF THE INVENTION

In accordance with the present invention, this objective is achieved by creating intermediate levels of priority for a given interrupt request. With such an approach, plural interrupts can be handled on one interrupt request line to thereby permit execution of a number of functions that is greater than the number of interrupt lines. A circuit constructed in accordance with the present invention is capable o monitoring the various functions during their execution, as well as arbitrating among plural interrupts so as to maintain the priority which has been assigned to them.

Further features of the present invention and their attendant advantages are explained in detail hereinafter with reference to a preferred embodiment illustrated in the accompanying drawings.

DESCRIPTION OF THE ILLUSTRATED EMBODIMENT

In the following description of a preferred embodiment of the invention, particular reference is made to the use of the invention within a microprocessor-controlled video, tape recording and reproducing system. However, it will be appreciated that the invention is not limited to this particular application. Rather, it is capable of being used with success in a number of different systems that employ interrupt requests to control the sequence in which various system functions are executed.

Figure 1:
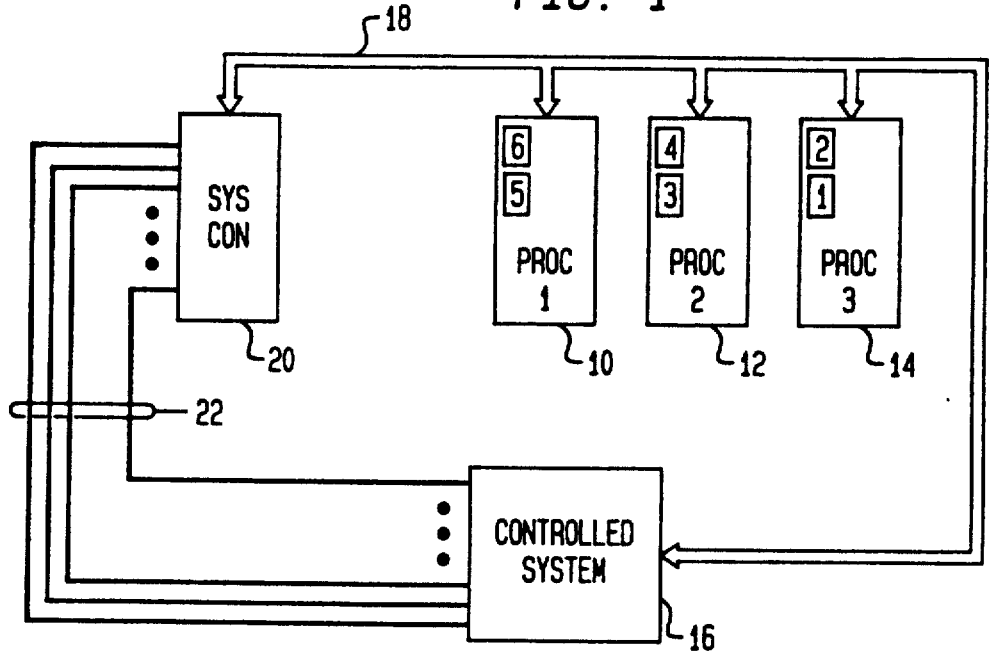
FIG. 1 is a general block diagram of a microprocessor control system which can incorporate the principles of the present invention.

Referring to FIG. 1, the general layout of a microprocessor-controlled system is illustrated in block diagram form. In the illustrated system, three microprocessors 10, 12 and 14 control various operations within a controlled structure 16. For example, this structure might be a video tape recorder. Control signals are transmitted from the processors to the recorder 16 by means of a bus 18. The processors are also connected to a system controller 20 by means of the bus 18. The system controller receives input signals regarding the status of certain events within the recorder 16. These input signals are provided to the system controller 20 by means of interrupt input lines 22. Each interrupt input line 22 is associated with a particular function within the controlled structure 16. For example, if the controlled structure is a video tape recorder, the signals on the various input lines might comprise tachometer pulses from each of the scanner and tape capstan, reference vertical pulses, various control track pulses from the tape which indicate the frame of video information that is being produced and the position along the tape, and transducer head deflection pulses. Each time one of these pulses is received by the system controller 20, it generates an interrupt request and places this request on the bus 18 to be transmitted to the processors. Each processor is responsive to predetermined interrupt requests. In the illustrated example, six interrupt levels are available, with each processor being responsive to two of the levels, as represented by the numbered blocks within each processor. These levels are linearly prioritized, with level six having the highest priority and level one being of lowest priority.

The problem to which the present invention is directed occurs when the number of available interrupt request lines is not adequate to accommodate all of the various interrupts that need to be serviced. For example, this problem can occur in a video tape recording environment when a certain interrupt must be serviced by more than one of the processors. In particular, in many recorder operations it is convenient to use the reference vertical pulse as a starting point for various processor operations. Accordingly, it may be necessary to provide a reference vertical interrupt request to each of the three processors. This interrupt request is generally given the highest priority, and so a reference vertical pulse which arrives at the system controller 20 will generate an interrupt request on each of three separate lines to provide the request to each of the processors. In this case, if one of the interrupt lines at each processor is dedicated to reference vertical, only three interrupt request lines remain for all of the other system events that need to be detected and serviced. This number of available lines could prove to be inadequate in a highly sophisticated video tape recording system.

Figure 2:
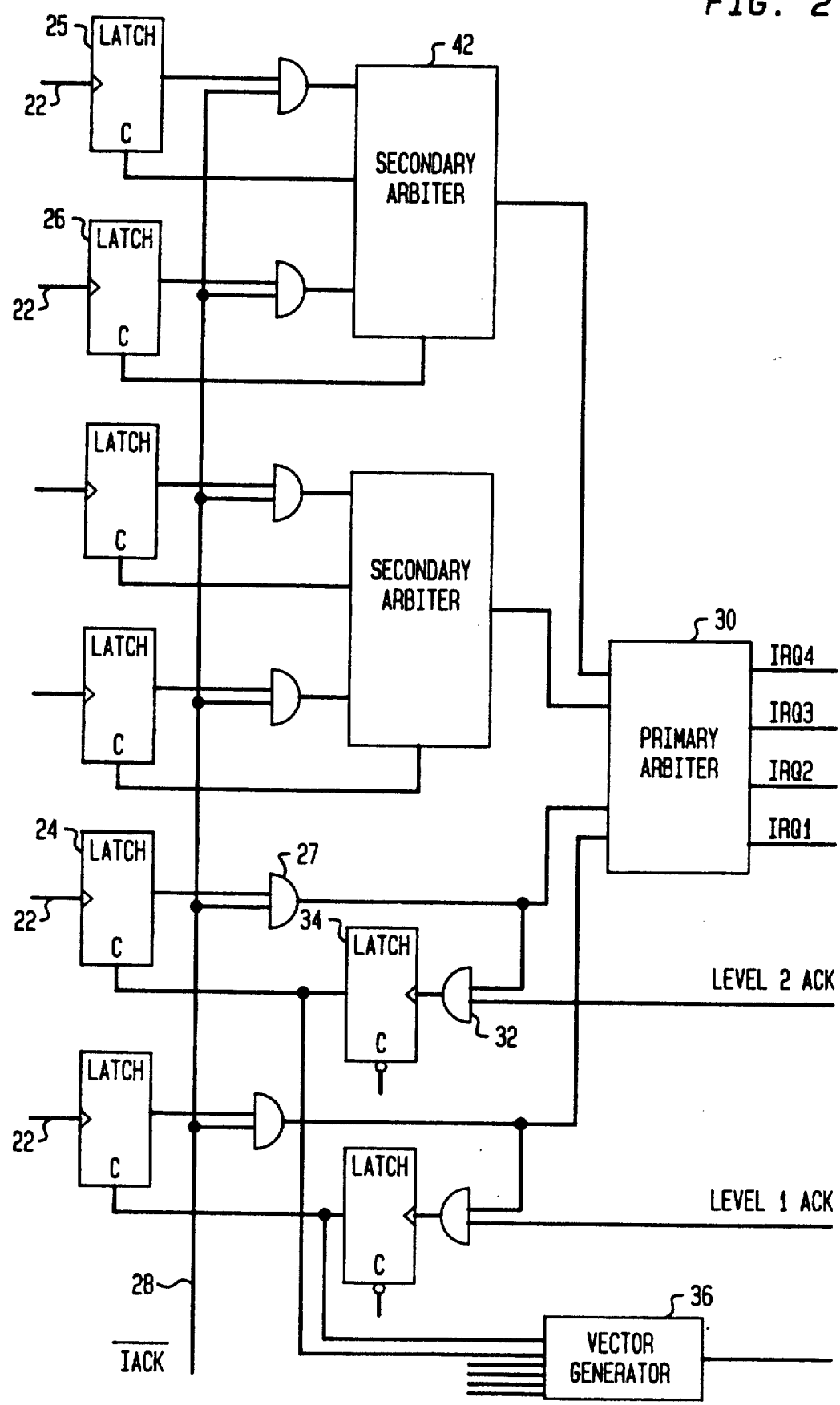
FIG. 2 is a schematic block diagram of the interrupt request generating portion of the system controller.

In accordance with the present invention, this problem is overcome by a signing multiple priority levels within the system controller 20 for one or more of the interrupt request lines. Referring to FIG. 2, a system controller is illustrated which is capable of accommodating six different interrupts when only four interrupt request lines IRQ1-IRQ4 are available. The two request lines with the highest priority, IRQ4 and IRQ3, are each assigned two further levels of priority. The other two lines, IRQ2 and IRQ1, only have one priority level.

Each of the six interrupt input lines 22 is respectively connected to a detection latch 24, 25, 26. Upon detecting a pulse on one of the input lines 22, the corresponding latch produces a high level signal that is fed to one input terminal of an AND gate 27. The other input terminal of each of the AND gates 27 is connected in common to an interrupt acknowledge line 28. As long as an interrupt acknowledge signal IACK is not present, the AND gate 27 permits the signal from the latch to pass. In the case of an interrupt at either of the two lowest levels shown in FIG. 2, the signal from the latch 24 is presented directly to a primary arbiter 30. The arbiter operates in a well known manner to establish a level of priority for each of the four interrupt request lines. If a request for an interrupt should occur for two different lines at the same time, the arbiter determines which of the two requests has the higher priority and generates an interrupt request signal on the request line having the higher priority. Once this interrupt has been acknowledged, the arbiter then generates an interrupt request signal for the next lowest priority line for which an interrupt has been requested. If only one interrupt is present at the arbiter, it merely activates the appropriate line. When one of the lines is activated, an appropriate interrupt request is placed on the bus 18 to be transmitted to the processors 10-14.

When a processor receives an interrupt request, it responds to the request with an acknowledgement. For example, if a request for interrupt level 2 is placed on the bus, the appropriate processor 14 would respond by acknowledging a request at level 2. This acknowledgement is presented to one input terminal of an AND gate 32 associated with that interrupt level. The other input terminal of the AND gate 32 is connected to the output terminal of the AND gate 27 for that level. Thus, if an interrupt acknowledgement for a particular level is received at the system controller 20 and an interrupt for that level had actually been requested (through actuation of the latch 24), the AND gate 32 will be actuated.

This actuation of the AND gate 32 triggers a storage latch 34 to indicate that the requested interrupt has been acknowledged for servicing by the processor. The storage latch produces an output signal that is fed to a vector generator 36. In response to the signal from the storage latch 34, the vector generator places on the bus 18 a vector that is unique to the particular interrupt that has been requested. This vector is received by the processor that acknowledged the interrupt request and identifies the location of a control subroutine to be executed by the processor. In response to this vector, the processor executes the subroutine to service the particular system function that is associated with the interrupt.

In addition, the output signal from the storage latch 34 is presented as a clear input signal to the interrupt detection latch 24. Thus, during the time that the interrupt is being serviced, any further interrupt requests for that level which are received at the system controller will not be placed on the bus. When the processor has completed the execution of the subroutine associated with the interrupt, it generates a signal. This signal clears the storage latch 34, and thereby readies the detection latch 24 for the reception of new interrupts.

Figure 3:
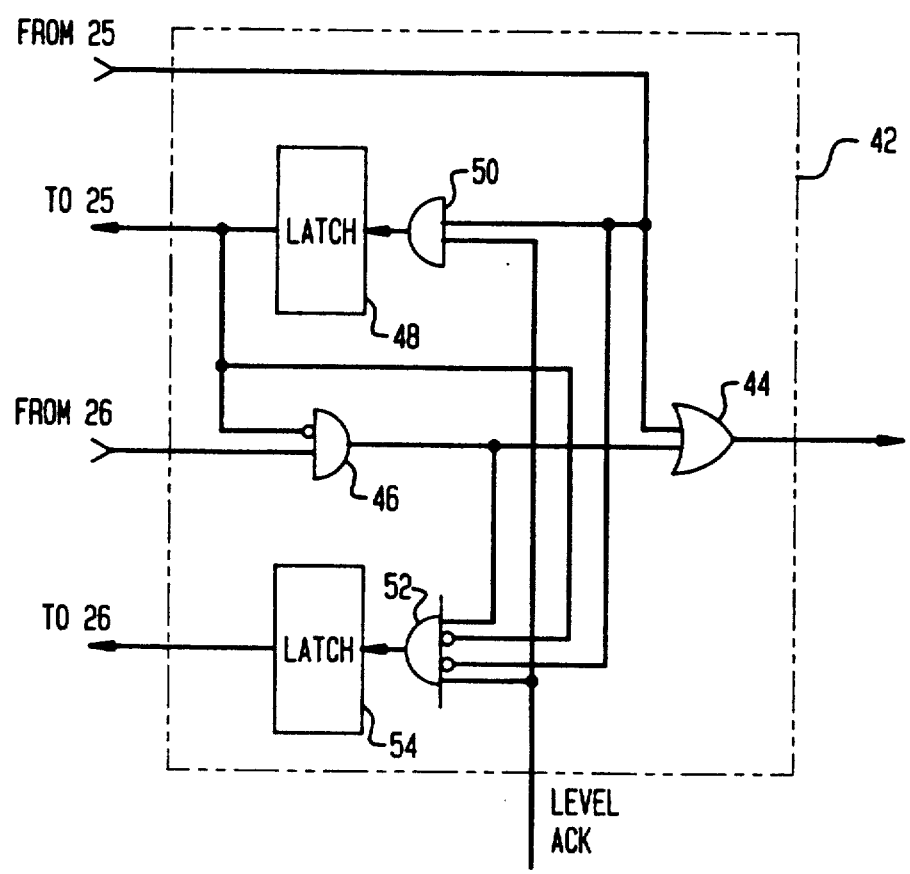
FIG. 3 is a more detailed block diagram of the secondary arbiter within the system controller.

Referring now to the case for interrupt level 4, two different events can cause an interrupt request to be generated at this level. Each of the events is separately detected by a respective request latch 25 or 26. The output signals from these latches also function to generate interrupt signals on the interrupt line IRQ4. However, since more than one event is associated with this line, the output signals from the latches 25, 26 are first presented to a secondary arbiter 42. An example of a secondary arbiter is illustrated in FIG. 3.

All of the events associated with the interrupt level are assigned an order of priority. In the illustrated example, the event which triggers the latch 25 has the highest order of priority. Accordingly, when the latch 25 generates a high level interrupt signal, the secondary arbiter 42 passes this signal onto the primary arbiter 30 by means of an OR gate 44. If a signal is generated by the latch 26 of lower priority, this signal is passed to the primary arbiter 30 only if the higher level interrupt is not being serviced. Accordingly, the output signal from the latch 26 is presented to one input terminal of an AND gate 46. The other input terminal of the AND gate receives an inverted output signal from a storage latch 48 for the higher level interrupt. If the higher level interrupt is not being serviced, the storage latch 48 will be in a clear state and thereby enable the gate 46 to pass the signal from the latch 40 onto the OR gate 44. When this happens, an interrupt at level 4 will be presented to the primary arbiter 30, which operates in the usual manner to place an interrupt request on the bus 18 at that level.

When one of the processors acknowledges receipt of the interrupt request on line IRQ4, the acknowledgement signal is applied as an input to each of two AND gates 50 and 52. The AND gate 50 that is associated with the level of higher priority corresponds to the AND gate 32. Thus, if an acknowledgement is received for level 4 and an interrupt has been requested for the higher priority interrupt within that level, the storage latch 48 for that interrupt level is triggered to cause the vector associated with the interrupting event to be generated by the vector generator 36 as well as to clear the detection latch 25. If the interrupt having the lower priority within level 4 is the one that was requested (i.e. latch 26 is triggered), its associated storage latch 54 will not be actuated unless two other conditions are also present. Namely, the higher priority interrupt within that level must not have been requested nor must it be presently in service. Accordingly, the AND gate 52 which triggers the storage latch 54 of the lower priority interrupt has two additional input terminals which receive signals indicative of these two conditions. Thus, the latch 54 is triggered when (a) the lower priority interrupt has been requested (through actuation of the AND gate 46), (b) a level 4 interrupt has been acknowledged, (c) the latch 25 has not been actuated to request a higher priority interrupt, and (d) the latch 48 has not been actuated to indicate that the higher priority interrupt is being serviced. If all of these conditions are present, the latch 54 will cause the vector associated with the lower priority interrupt at level 4 to be generated on the bus 18.

The execution of the lower priority interrupt will not inhibit the generation of an interrupt request in response to an interrupt of higher priority. Thus, even if the latch 54 should be in its set state to indicate that the lower priority interrupt is being serviced, actuation of the latch 25 will be passed on to the primary arbiter 30 through the OR gate 44. This will cause another interrupt request to be generated on the line IRQ4. In response to this request, the processor will temporarily suspend the execution of the routine, for the lower priority interrupt and will service the higher priority interrupt in accordance with instructions from the vector generator.

The vector generator 36 can be implemented by any suitable type of look-up table that produces a unique vector for each of the various input signals that are received from the storage latches 34, 48, 54. In one embodiment of the invention, each vector can be an 8-bit binary number. The four most significant bits of the number can be preset at one binary level, e.g. a logic one. The next three bits in the number can comprise a binary identification of the level number. The last bit is normally preset at binary one. However, for the interrupt lines which have two levels of priority, this least significant bit is varied to be a binary one or a binary zero in dependence upon whether the interrupt relates to the higher or lower priority for that interrupt level.

From the foregoing it will be appreciated that expansion of the interrupt capabilities of a microprocessor system can be provided by assigning multiple levels of priority to individual interrupt lines. Although the illustrated embodiment relates to the case in which two levels of priority are assigned to an interrupt line, it will be appreciated that any number of priority levels can be employed for each line. Thus, the present invention makes it possible to utilize only a single interrupt line for each processor in the system. That interrupt line would have as many levels of priority as is necessary to accommodate all of the various events that require servicing within a system.

It will thus be appreciated by those of ordinary skill in the art that the present invention can be embodied in other specific forms without departing from the spirit or essential characteristics thereof. For example, although a practical embodiment of the invention has been shown to be implemented with logic hardware, many of the functions that are performed by such hardware could also be carried out through appropriate software routines. The presently disclosed embodiment is therefore considered in all respects to be illustrative and not restrictive. The scope of the invention is indicated by the appended claims rather than the foregoing description, and all changes that come within the meaning and range of equivalence thereof are intended to be embraced therein.

What is claimed is:

1. A method for expanding the interrupt processing capabilities of a microprocessor system having a limited number of interrupt lines with different respective levels of priority, comprising the steps of:
    assigning plural interrupt-generating events to one of said interrupt lines and an order of priority among said plural events;
    storing a unique vector for each of said plural events;
    detecting the occurrence of at least one of said plural events and determining whether more than one of said plural events has occurred;
    selecting one of the events which has occurred, in accordance with said order of priority, if more than one event has been determined to have occurred;
    generating an interrupt request on said one interrupt line in response to the selected event;
    detecting acknowledgment of said interrupt request; and
    transmitting one of said stored vectors in response to acknowledgement of the interrupt request on said line, the particular vector that is transmitted being determined by the selected event.

2. In a microprocessor controlled system in which the microprocessor has a predetermined number of interrupt levels and in which various system functions are controlled in response to interrupt requests that are respectively associated with the system functions, a method for controlling a number of functions that is greater than the predetermined number of interrupt levels, comprising the steps of:
    assigning at least two of said system functions to one of said interrupt levels;
    detecting an input signal associated with one of said assigned system functions;
    determining whether another of the system functions assigned to said interrupt level is being serviced by the microprocessor when said input signal is detected;
    generating an interrupt request at said one interrupt level in response to the detected input signal, and only if said other system function is not being serviced;
    detecting acknowledgement of said interrupt request; and
    responding to said acknowledgement by generating a vector that is unique to the system function that is associated with the detected input signal.

3. The method of claim 2 further including the steps of establishing an order of priority among the functions assigned to said one interrupt level, determining whether an input signal associated with a function of higher priority has been detected when said acknowledgement is received, and generating said vector only if an input signal for a higher priority function has not been detected.

4. A microprocessor control system, comprising:
    processing means which has a predetermined number of interrupt request lines;
    means for detecting the occurrence of events associated with various functions and for generating separate interrupts for each of said functions;
    a first arbiter for receiving at least two of said interrupts and generating a request for an interrupt on a predetermined one of said lines, said first arbiter establishing an order of priority among said two interrupts and generating a request in response to the lower priority interrupt only when the higher priority interrupt is not received;
    a second arbiter for receiving requests for interrupts for each of said lines, including requests that are generated by said first arbiter, and generating an interrupt request on one of said interrupt request lines in accordance with an order of priority that is assigned to each of said lines.

5. The control system of claim 4, wherein said processor means acknowledges an interrupt request on one of said lines, and said first arbiter includes means responsive to acknowledgement of an interrupt request on said predetermined line for generating a signal that identifies which of said two interrupts is the one that caused generation of the request.

6. The control system of claim 5 further including means responsive to said signal from said first arbiter for generating a vector which is unique to the interrupt that caused the generation of the request.

* * * * *